United States Patent [19]

Esser

[11] Patent Number: 4,497,673
[45] Date of Patent: Feb. 5, 1985

[54] METHOD OF MANUFACTURING DOUBLE-WALLED TUBE

[75] Inventor: Alexander Esser, Warstein, Fed. Rep. of Germany

[73] Assignee: Esser-Werke GmbH Vorm. Westmontan-Werke, Warstein, Fed. Rep. of Germany

[21] Appl. No.: 447,626

[22] Filed: Dec. 6, 1982

[30] Foreign Application Priority Data

Dec. 8, 1981 [DE] Fed. Rep. of Germany ....... 3148498

[51] Int. Cl.$^3$ .............................................. C21D 1/00
[52] U.S. Cl. ..................... 148/127; 29/446; 138/140; 148/130
[58] Field of Search ................. 29/447, DIG. 35, 446; 148/127, 151, 130; 138/143, 140, 147

[56] References Cited

U.S. PATENT DOCUMENTS

| 1,101,084 | 6/1914 | McCarty | 29/447 |
| 1,307,979 | 6/1919 | Knapp | 29/447 X |
| 2,647,847 | 8/1953 | Black et al. | 29/447 |

FOREIGN PATENT DOCUMENTS

| 436961 | 10/1935 | United Kingdom | 29/447 |
| 475244 | 11/1937 | United Kingdom | 29/DIG. 35 |
| 1327441 | 8/1973 | United Kingdom | 29/447 |

Primary Examiner—Charlie T. Moon
Attorney, Agent, or Firm—Michael J. Striker

[57] ABSTRACT

A double-walled tube is produced by providing an inner core tube and an outer casing tube, wherein the outer diameter of the inner core tube is smaller than the inner diameter of the outer casing tube, with consideration of manufacturing tolerances and/or noncircularity, by such a value that insertion of the core tube into the casing tube can easily be performed because of a sufficient amount of play, and the core tube is brought into abutment under the action of repeated, successive hardening steps with a stepped radial expansion, against the inner surface of the casing tube.

5 Claims, 2 Drawing Figures

METHOD OF MANUFACTURING DOUBLE-WALLED TUBE

BACKGROUND OF THE INVENTION

The present invention relates to a method of manufacturing a double-walled tube for transporting solid materials, and also to a double-walled tube.

Double-walled tubes are used, for example, in mining underground operations for pneumatic transportation of smallpiece minerals which are brought in the excavated longwall face space as filling material. Moreover, the double-walled tubes are provided during hydraulic transportation of sands for use particularly in the case of excavating works. The properties of the solid material to be transported require tubes with a wear-resistant inner surface having a long service life. On the other hand, the same tubes must be designed so that they grow under the action of inner pressure loads and particularly during transportation of construction materials to the place of use under the action of rough impact loads. For satisfying both these extreme requirements, for years double-walled tubes have been utilized in which a core tube is designed especially for wear loads, whereas a casing tube is designed for pressure and impact loads. It is required that the core tube and the casing tube are fixedly connected with one another. One proposal for manufacturing such double-walled tubes is disclosed in the DE-AS No. 1,099,284. In accordance with this method, the core tube is expanded in the casing tube under the action of cold deformation and simultaneously fixed relative to the outer surface. The DE-PS 858,615 proposes a method in accordance with which a tube is composed of a plurality of steel layers whose heat expansion coefficient decreases from inside outwardly. In accordance with the DE-PS 712,586, a method is proposed in accordance with which in a two-layer tube a glass-hard inner layer is welded with a hardenable tough outer layer. The same source also describes a high-hardened wear-resistant core tube over which a sheet of a tough non-hardenable metal is bent to form a slotted casing tube, and the casing tube is finally welded along its longitudinal edges. The casing tube is shrunk on the core tube because of welding and provides for the desired immovable assembly. Moreover, core tubes of slotted springy wear-resistant steels are used whose slotted edges prior to the insertion into a casing tube of a tough steel are overlapped. The slotted core tube is then expanded by the inner pressure and pressed against the casing tube, whereas finally the slot edges abut against one another. This method is disclosed in the DE-PS 593,599. In the same source, it is disclosed that a pressure expansion is also possible without longitudinal slots. The expansion of the core tube in the casing tube is carried out by a respective tool.

Finally, in accordance with a method proposed in the DE-OS 2,905,071, a slotted core tube of a hardenable tube is used whose outer diameter prior to insertion into a casing tube is greater than the inner diameter of the casing tube. The slot width and the outer diameter are so determined relative to one another that after the pressing-in of the core tube, because of radial compression, the return spring effect provides for firm lying of the core tube in the casing tube with tight abutment of the slot edges. After this, hardening of the core tube takes place, and volume increase resulting from the hardening of the core tube no longer presses against the casing tube. In addition, there is also a possibility to cool the casing tube similarly, to increase the pressing force.

The above discussed developments, which have taken place over several decades, make clear that the experts have not in practice been able to come to a completely satisfactory concept for manufacturing a double-walled tube with a wear-free core tube and a tough casing tube. All proposals as a whole, regardless of whether slotted or unslotted tubes are used, deal with a core tube and a casing tube which are designed such that the outer diameter of the core tube only insignificantly deviates from the inner diameter of the casing tube. Only by maintenance of these narrow tolerances do the experts see a possibility to press the core tube in the required manner against the casing tube. The expenditures both related to accurately manufacture of tubes and also to the devices for insertion of the tubes into one another and hardening are relatively high.

SUMMARY OF THE INVENTION

Accordingly, it is an object of the present invention to provide a method of manufacturing a double-walled tube for transporting solid materials, and a double-walled tube produced thereby, which avoid the disadvantages of the prior art.

More particularly, it is an object of the present invention to provide a method of manufacturing a double-walled tube which has considerably lower manufacturing expenditures as compared with known methods, and both with respect to the utilized materials and the manufacturing method.

Moreover, it is also an object of the present invention to produce by this highly advantageous method a suitable double-walled pipe for solid material transport.

In keeping with these objects and with others which will become apparent hereinafter, one feature of the present invention resides, briefly stated, in that, with consideration of manufacturing tolerances and/or noncircularity during manufacture of the tube, the outer diameter of the circumferentially closed core tube is so smaller than the inner diameter of the casing tube and-/or the inner diameter of the casing tube is so greater than the outer diameter of the core tube that the core tube with a sufficient play can be easily inserted into the casing tube, and the core tube, under the action of repeatedly following hardening steps with step-like radial expansion, is brought to firm surface abutment against the inner surface of the casing tube.

The invention uses the known phenomenon that during hardening of suitable carbon steels a volume increase takes place. However it is in unpredictable manner been found that this volume increase is not limited to one-time hardening. Moreover, it has been determined in a surprising manner that an already hardened tube, in the event of further repeated hardening steps, expands in a further progression and in the sense of its outer diameter continuously increases. This unexpected result leads to inventive features which are not known in the prior art, that the core tube is fixed in the casing tube unobjectionably only by hardening, and the tubes can be utilized whose manufacturing and/or transporting requirements have great deviations in outer and inner diameter and/or noncircularity. The invention deals with the assumption that now also tubes with very high tolerances of simple quality standards can be used for manufacture of double-walled tubes.

For this purpose, a core tube can be used whose outer diameter is smaller than the inner diameter of the casing tube by so much that the core tube can be inserted with sufficient play into the casing tube, or the inner diameter of the casing tube is held such that a easy problem-free insertion of the tubes is guaranteed. It is to be understood that both features can be used in their combination.

Even the problem-free insertion of the core tube into the casing tube can eliminate a lot of known problems during manufacture of the double-walled tubes for the solid material transport. Further problems are eliminated in that, exclusively by a repeatedly performed hardening with stepped radial expansion, the arresting of the core tube in the casing tube takes place and simultaneously the desired wear-free condition of the core tube is attained.

In accordance with another feature of the present invention, it is possible that the heating temperatures of the hardening steps are identical. In dependence upon the requirements, it is also possible that the heating temperatures of the hardening steps are different from one another.

A double-walled tube for transporting of solid materials in accordance with the invention has a flame-hardened core tube and a casing tube of a tough material, which are pressed against one another by hardening, wherein in accordance with the invention with consideration of manufacturing and/or transport requirement tolerances and/or noncircularity the outer diameter of the unslotted core tube is smaller than the inner diameter of the casing tube, and under the action of repeated successive hardenings, and thereby acting step-like radial expansion of the core tube, it is brought to firm adhering surface abutment against the inner surface of the casing tube.

Such a tube is easy to manufacture, since core and casing tubes have relatively high tolerances, and for connection of the core tube and the casing tube as well as for manufacturing a wear-free inner surface a repeatedly successive hardening steps are used. In addition to drawn tube, also tube welded by longitudinal seams or spiral seams can be utilized. The tube diameter is insignificant so that the double tube of greater diameter can be manufactured in an economical manner. Transport-conditional noncircularity is automatically eliminated during the tube mounting.

The novel features which are considered characteristic of the present invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
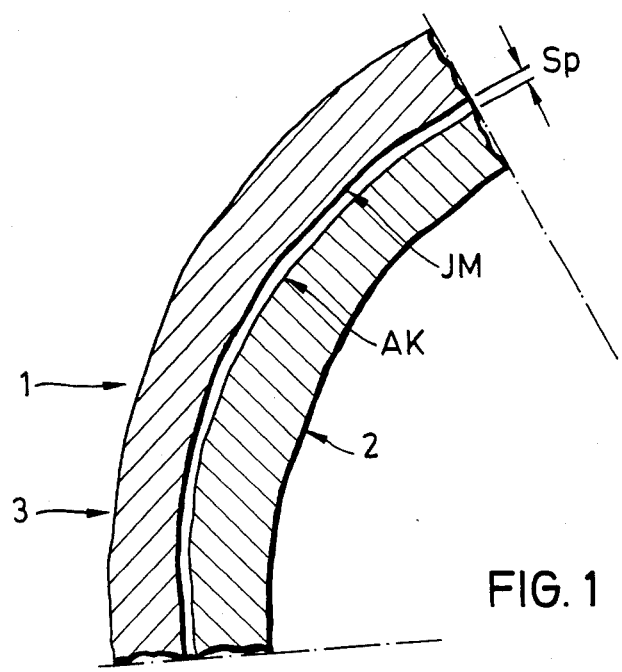
FIG. 1 is a view showing a vertical section of one sector of a circumferentially closed double-walled tube after insertion of both tubes into one another, but prior to hardening.

The drawings partially and schematically show a double-walled pipe 1 which serves for hydraulic or pneumatic transport of solid materials. It has an inner core tube which is identified with reference numeral 2 and composed of a hardenable carbon steel, for example C35, and an outer casing tube which is identified with reference numeral 3 and composed of a tough material, for example structural steel. At each end of the tube not shown flanges can be provided.

As can be seen from FIG. 1, the dimensions of the core tube 2 and the casing tube 3 are selected such that, with consideration of the manufacturing and transport-conditional tolerances and/or noncircularity, the outer diameter AK of the circumferentially closed or unslotted core tube 2 is dimensioned so much smaller than the inner diameter IM of the casing tube 3, that the core tube 2 can be inserted with a sufficient play Sp easily into the casing tube 3. For insertion of the core tube 2 into the casing tube 3 therefore no special steps or means are required.

Figure 2:
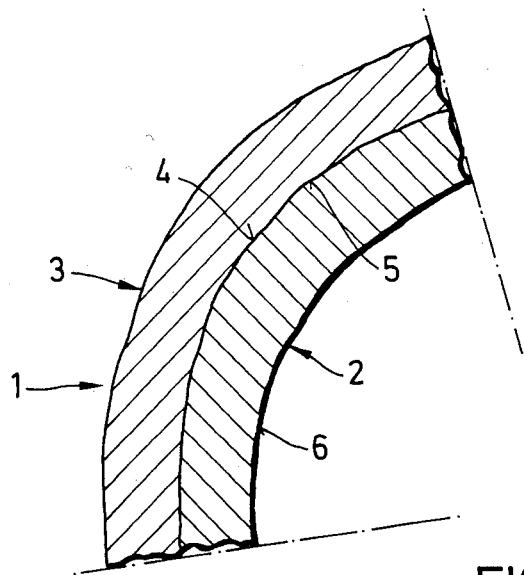
FIG. 2 is a view substantially corresponding to the view of FIG. 1, but showing the tube after the hardening.

After the insertion of the core tube 2 into the casing tube 3, the core tube 2 is repeatedly successively subjected to hardening steps. As a result of this, the core tube 2 expands and particularly such that, after an appropriate number of hardening steps (which depends on the play Sp between the core tube 2 and the casing tube 3), the outer surface 4 of the core tube 2 is pressed tightly against the inner surface 5 of the casing tube 3. This is shown in FIG. 2. In this manner, not only the desired wear-free condition takes place on the inner surface 6 of the core tube 2, but also a firmly adhering surface abutment of the core tube 2 against the casing tube 3 is provided.

It will be understood that each of the elements described above, or two or more together, may also find a useful application in other types of constructions differing from the types described above.

While the invention has been illustrated and described as embodied in a double-walled tube, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various appications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing a double-walled tube for transporting solid materials comprising the steps of, comprising the steps of providing a flame-hardened circumferentially uninterrupted core tube member of a hardenable carbon steel and a casing tube member of a tough steel material with an inner diameter of the casing tube member and the outer diameter of the core tube member selected such that a sufficient amount of play remains therebetween; inserting the core tube member into the casing tube member easily because of the sufficient amount of play; and subjecting the core tube member to repeatedly successive heat hardening steps for successive radial expansion of the core tube member during successive heat hardening steps and for firm adhering surface abutment of an outer surface of the core tube member against an inner surface of the casing tube and fixation of the core tube member in the casing tube member even with great deviations in the inner and outer diameters and/or noncircularity of the tube members.

2. A method as defined in claim 1, wherein said providing step includes providing the core tube and the casing tube dimensioned such that the outer diameter of the core tube is smaller than the inner diameter of the casing tube to obtain said amount of play.

3. A method as defined in claim 1, wherein said providing step includes dimensioning the core tube and the casing tube such that the inner diameter of the casing tube is greater than the outer diameter of the core tube to obtain said play.

4. A method as defined in claim 1, wherein said hardening steps include hardening the casing tube with temperatures which are equal for all said hardening steps.

5. A method as defined in claim 1, wherein said hardening steps includes hardening of the core tube with temperatures which are different in said hardening steps.

* * * * *